(12) United States Patent
Miyamoto

(10) Patent No.: US 7,296,814 B2
(45) Date of Patent: Nov. 20, 2007

(54) FRAME FOR MOTORCYCLES

(75) Inventor: Masatoshi Miyamoto, Shizuoka (JP)

(73) Assignee: Yamah Hatsudoki Kabushiki Kaisha, Shizuoka-Ken (JP)

( * ) Notice: Subject to any disclaimer, the term of this patent is extended or adjusted under 35 U.S.C. 154(b) by 81 days.

(21) Appl. No.: 11/088,260

(22) Filed: Mar. 22, 2005

(65) Prior Publication Data

US 2005/0247500 A1 Nov. 10, 2005

(30) Foreign Application Priority Data

Mar. 23, 2004 (JP) .............................. 2004/085547

(51) Int. Cl.
*B62K 19/02* (2006.01)
*B62K 19/18* (2006.01)

(52) U.S. Cl. .................... 280/281.1; 180/225; 180/219

(58) Field of Classification Search ............ 280/281.1; 180/225, 219
See application file for complete search history.

(56) References Cited

U.S. PATENT DOCUMENTS

| | | | |
|---|---|---|---|
| 3,508,765 A | | 4/1970 | Bauer et al. |
| 4,585,247 A | * | 4/1986 | Takada ..................... 280/281.1 |
| 4,696,363 A | | 9/1987 | Enda |
| 5,211,255 A | * | 5/1993 | Fukuda ........................ 180/219 |
| 5,261,504 A | * | 11/1993 | Katsura ....................... 180/219 |
| 6,446,996 B1 | * | 9/2002 | Horii ....................... 280/281.1 |
| 6,679,347 B2 | * | 1/2004 | Iimuro ....................... 180/219 |
| 6,796,030 B2 | * | 9/2004 | Mochizuki et al. ........ 29/897.2 |
| 7,073,617 B2 | * | 7/2006 | Miyashiro et al. .......... 180/219 |
| 2002/0189878 A1 | | 12/2002 | Iimuro |
| 2005/0006162 A1 | * | 1/2005 | Philipps et al. ............. 180/219 |
| 2005/0236204 A1 | * | 10/2005 | Ishikawa .................... 180/219 |
| 2005/0263334 A1 | * | 12/2005 | Okabe et al. ............... 180/219 |

FOREIGN PATENT DOCUMENTS

| | | |
|---|---|---|
| EP | 1403177 A2 | 3/2004 |
| EP | 1462351 A2 | 9/2004 |
| JP | 01237276 A | 9/1989 |
| JP | 03186490 A | 8/1991 |
| JP | 05069873 A | 3/1993 |
| JP | 06316285 A | 11/1994 |
| JP | 10007060 A | 1/1998 |
| JP | 2001260971 A | 9/2001 |

OTHER PUBLICATIONS

European Search Report for corresponding European patent application No. 05006430 lists the references above.

* cited by examiner

*Primary Examiner*—Lesley D. Morris
*Assistant Examiner*—Marlon Arce-Diaz
(74) *Attorney, Agent, or Firm*—Hogan & Hartson LLP

(57) ABSTRACT

A frame for motorcycles includes a first frame section having a head pipe portion that supports a front fork and a second frame section having a pair of rear arm brackets that support a rear arm and are arranged away from each other in a direction along a vehicle breadth. The first frame section includes a gusset portion having a hollow closed, cross sectional shape and formed with an opening, which is opened rearwardly of the head pipe portion. The rear arm brackets, respectively, include a connection end having a cross sectional shape to be opened inward in the direction along the vehicle breadth, and extending toward the gusset portion. The connection ends of the rear arm brackets are welded to an edge of the opening of the gusset portion.

20 Claims, 15 Drawing Sheets

[Fig. 1]
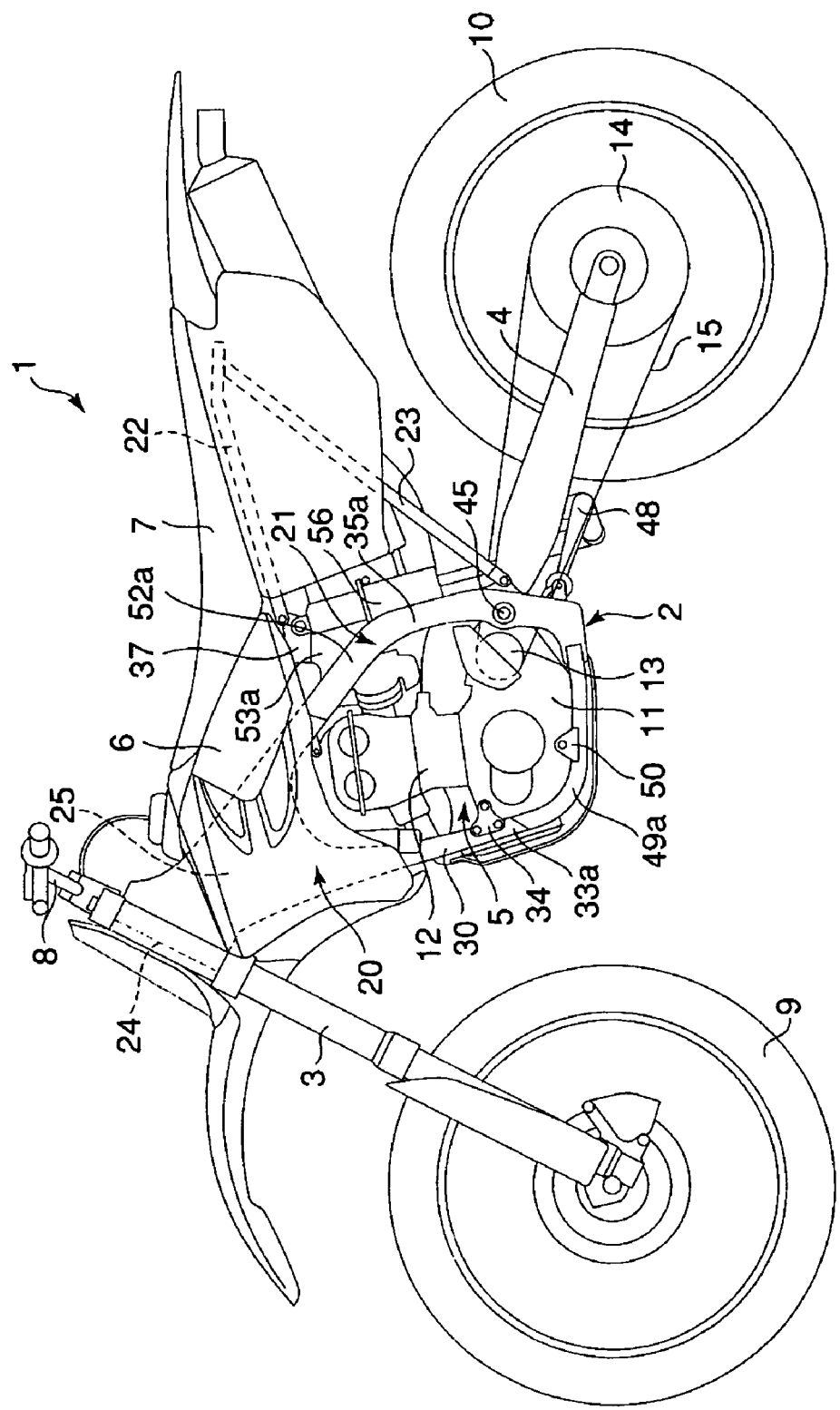

[Fig. 2]
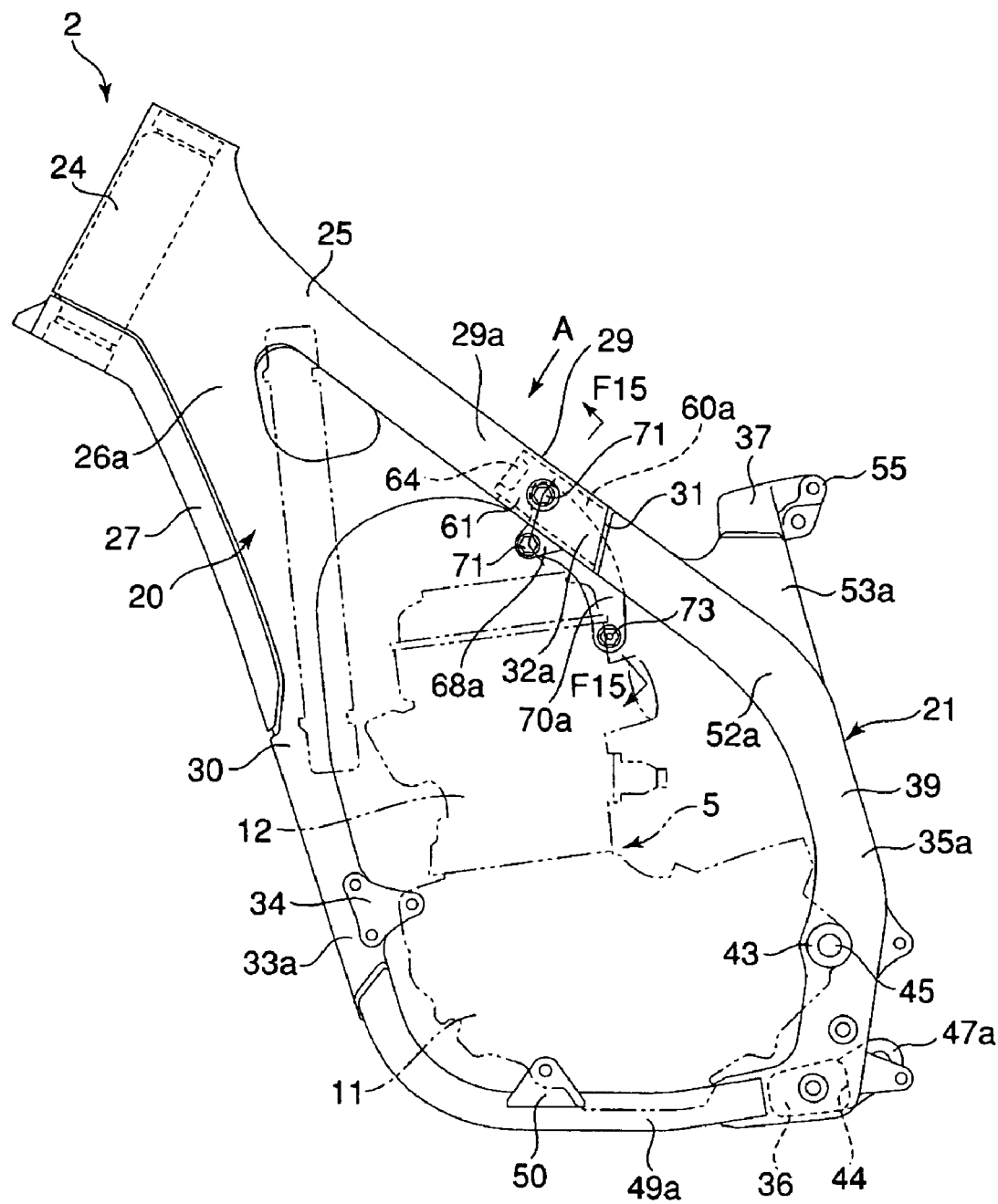

[Fig. 3]
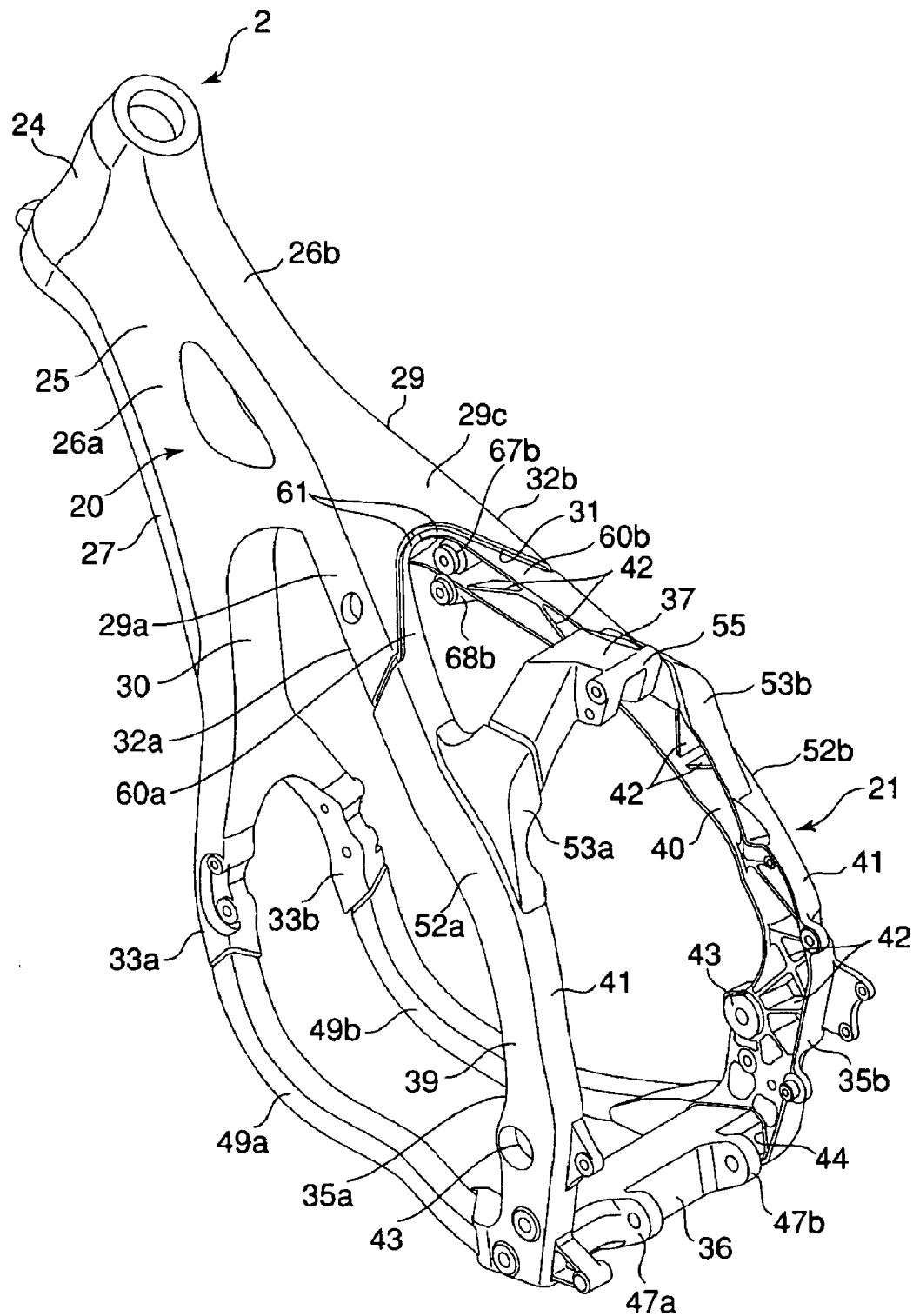

[Fig. 4]
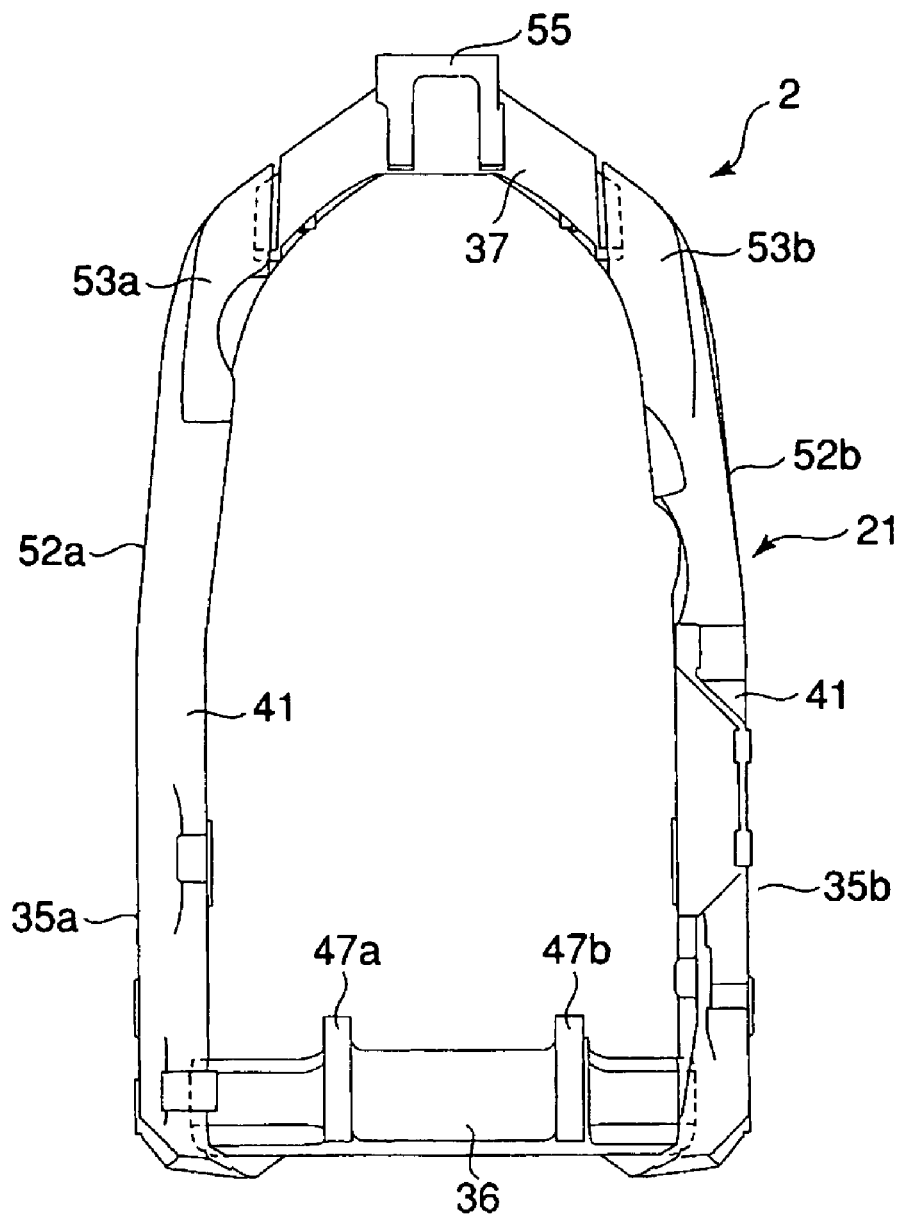

[Fig. 5]
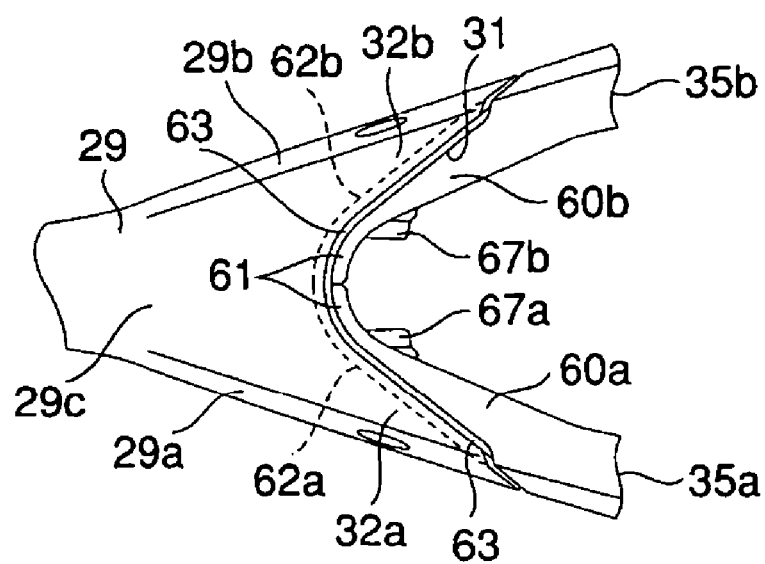

[Fig. 6]
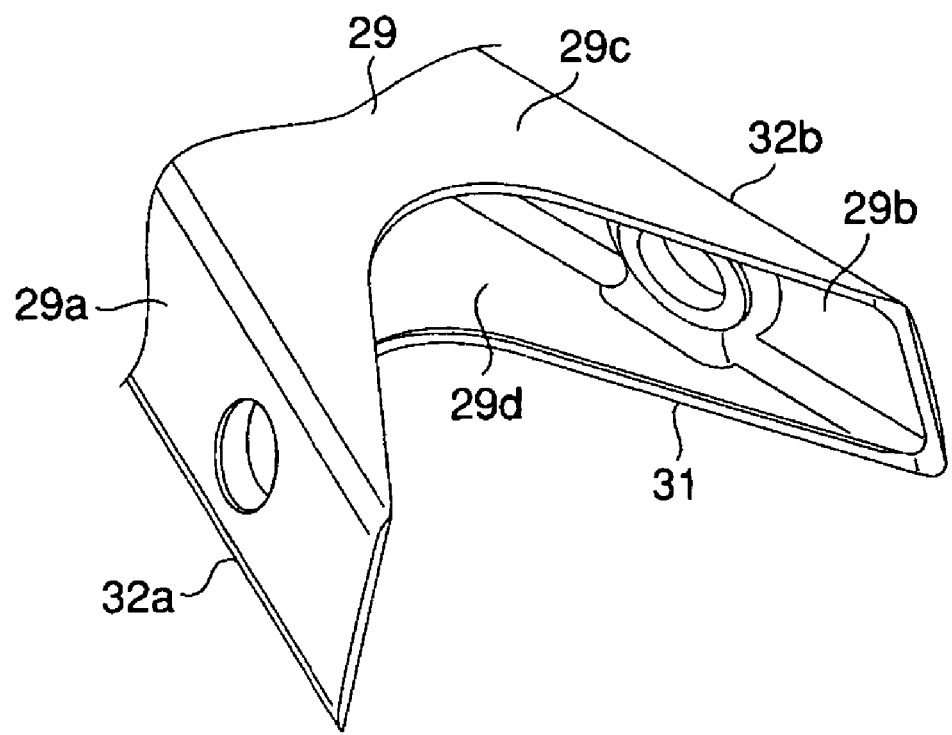

[Fig. 7]
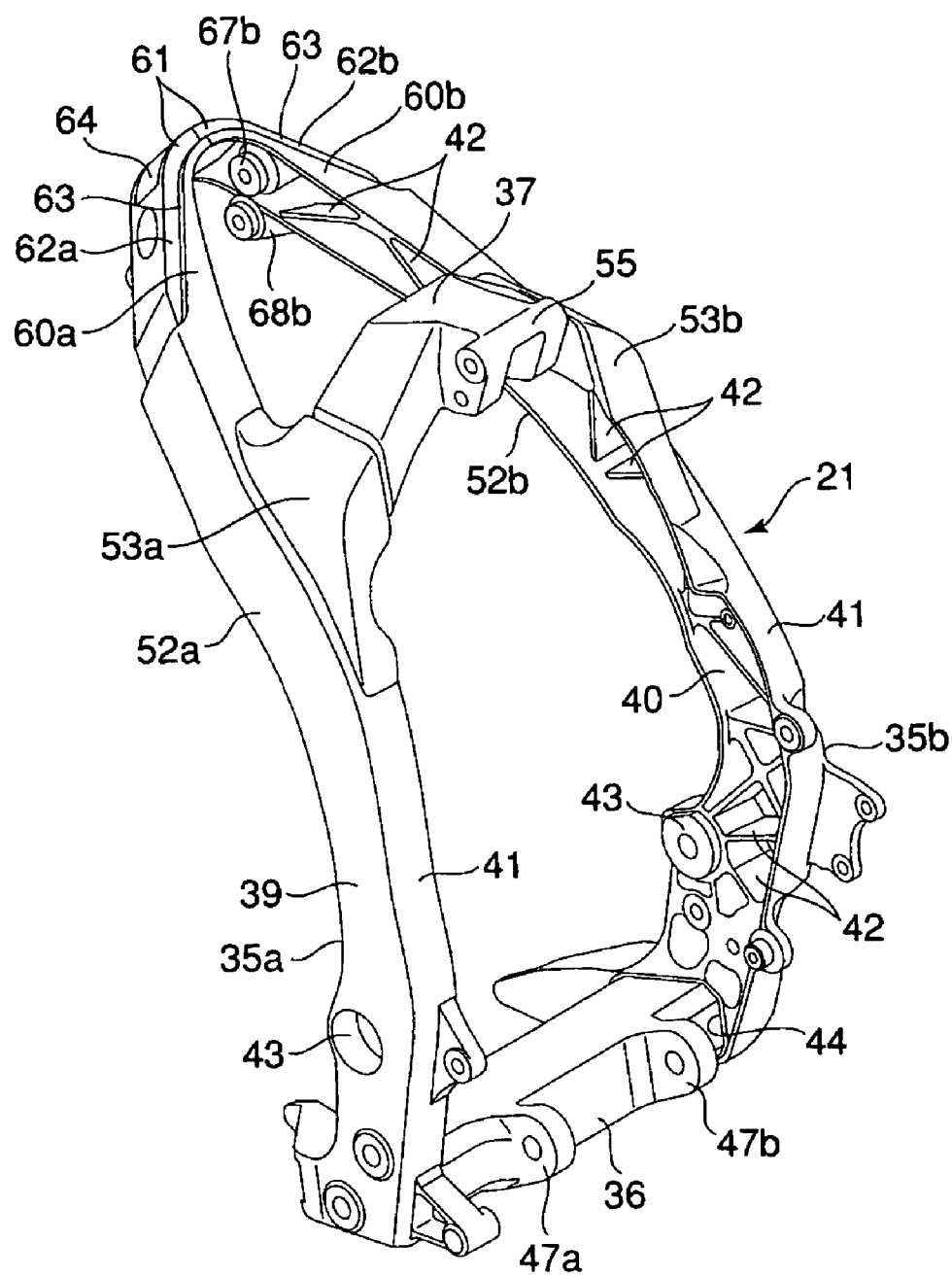

[Fig. 8]
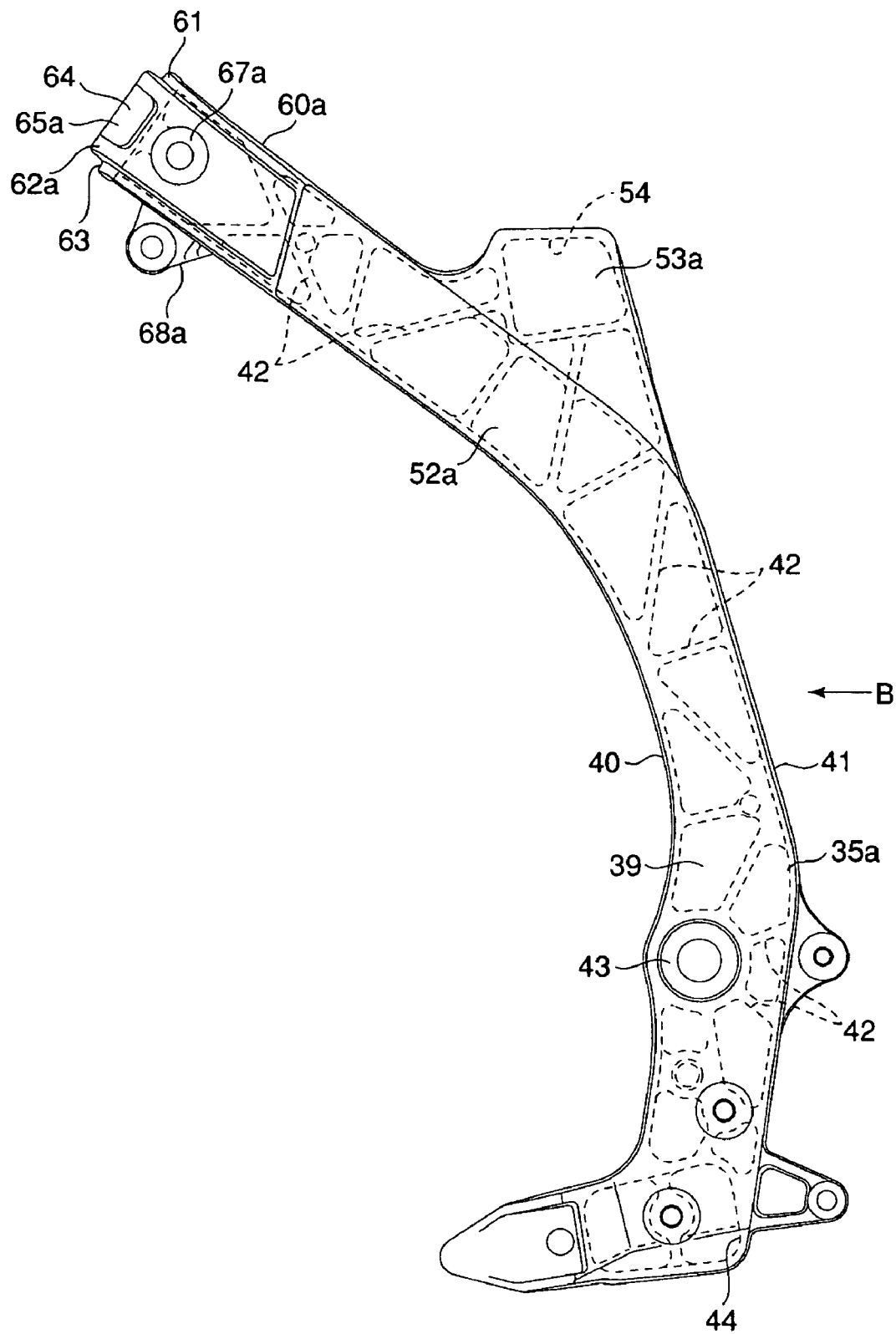

[Fig. 9]
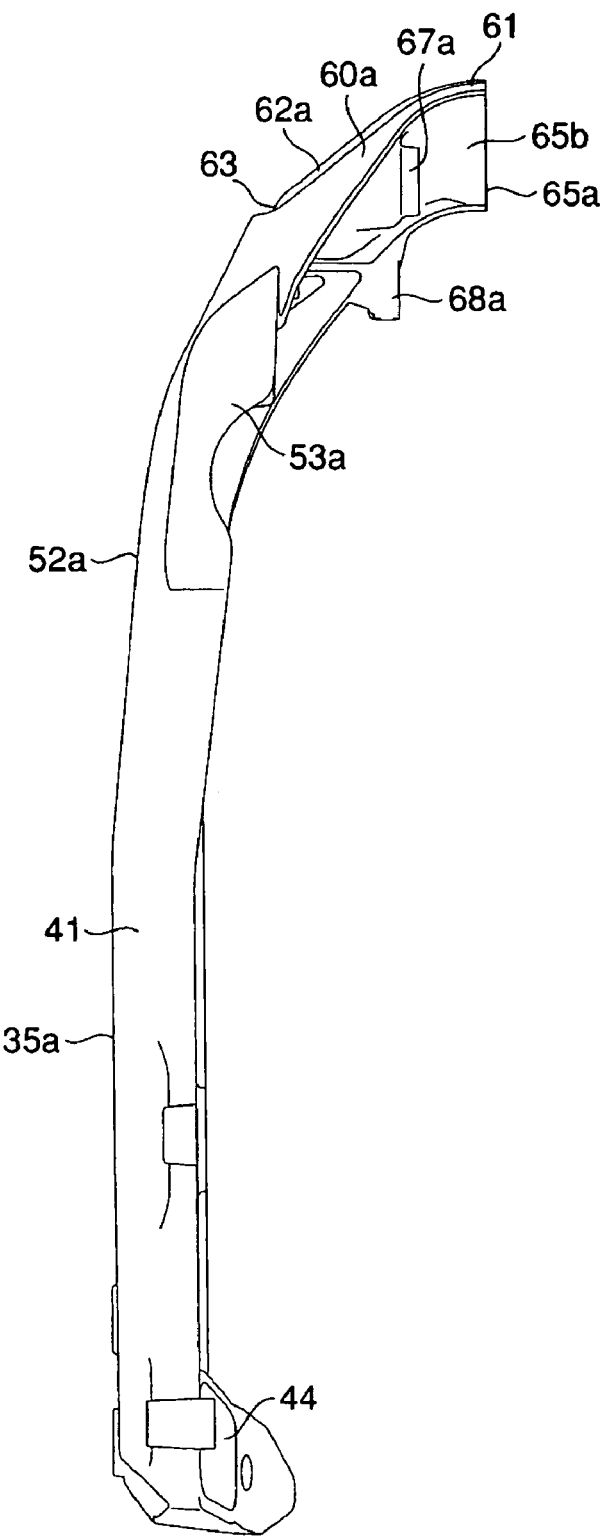

[Fig. 10]
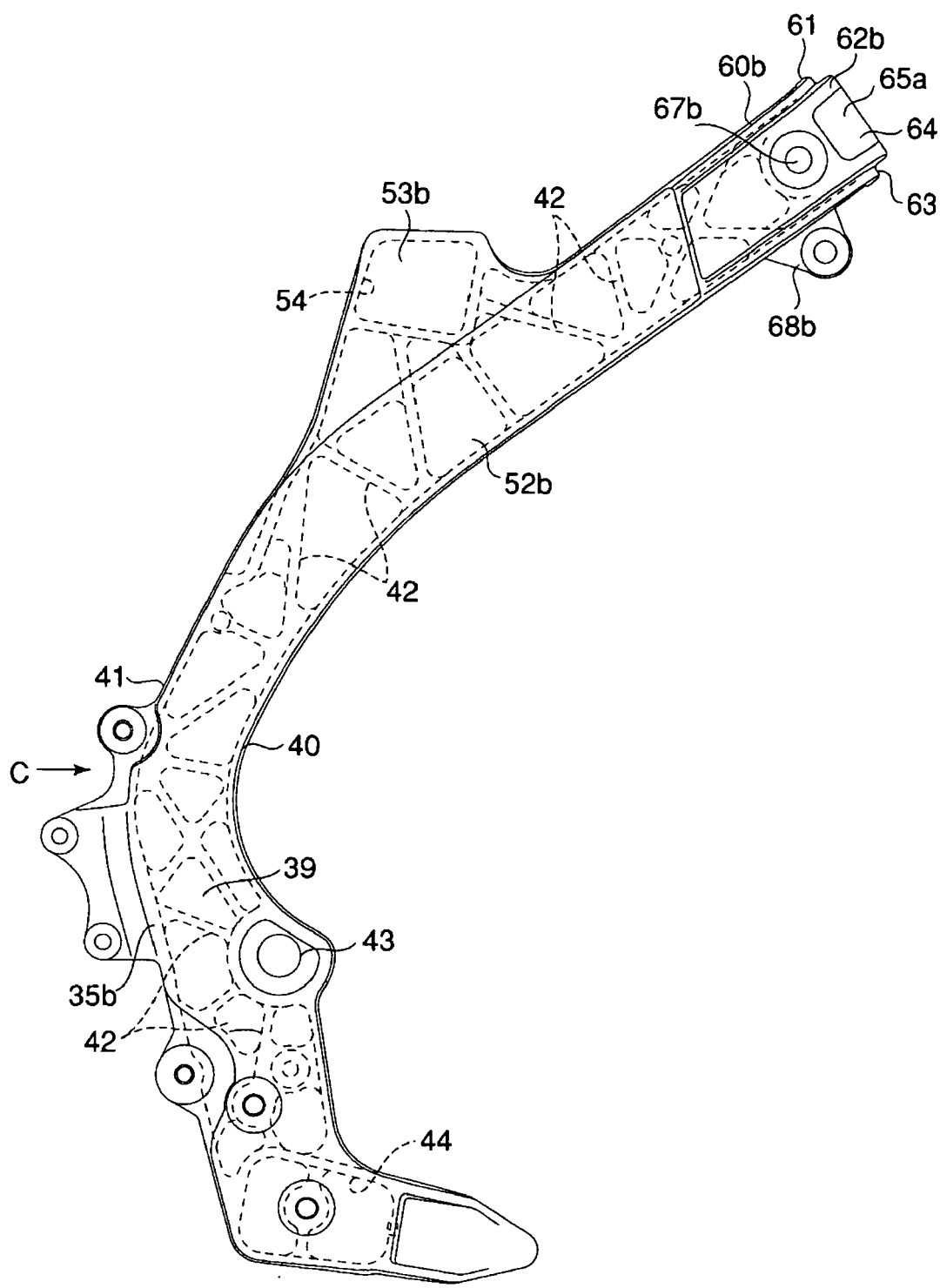

[Fig. 11]
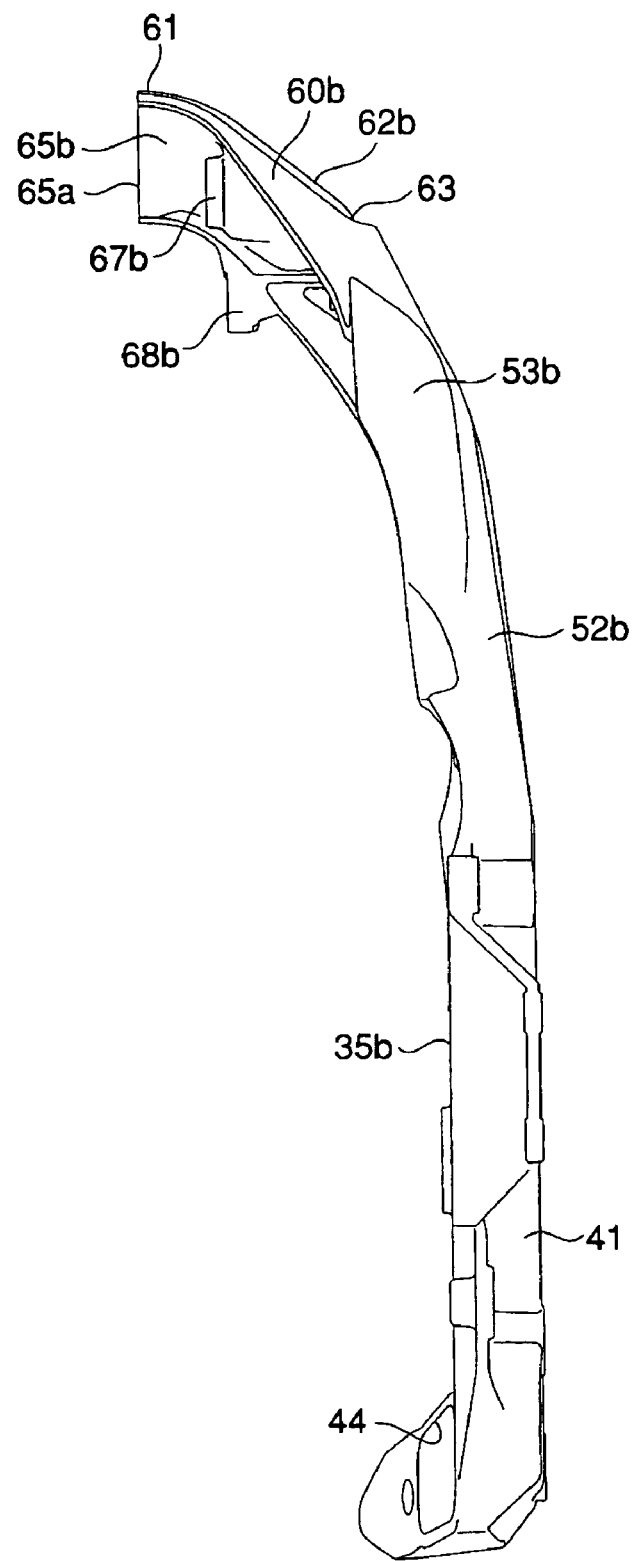

[Fig. 12]
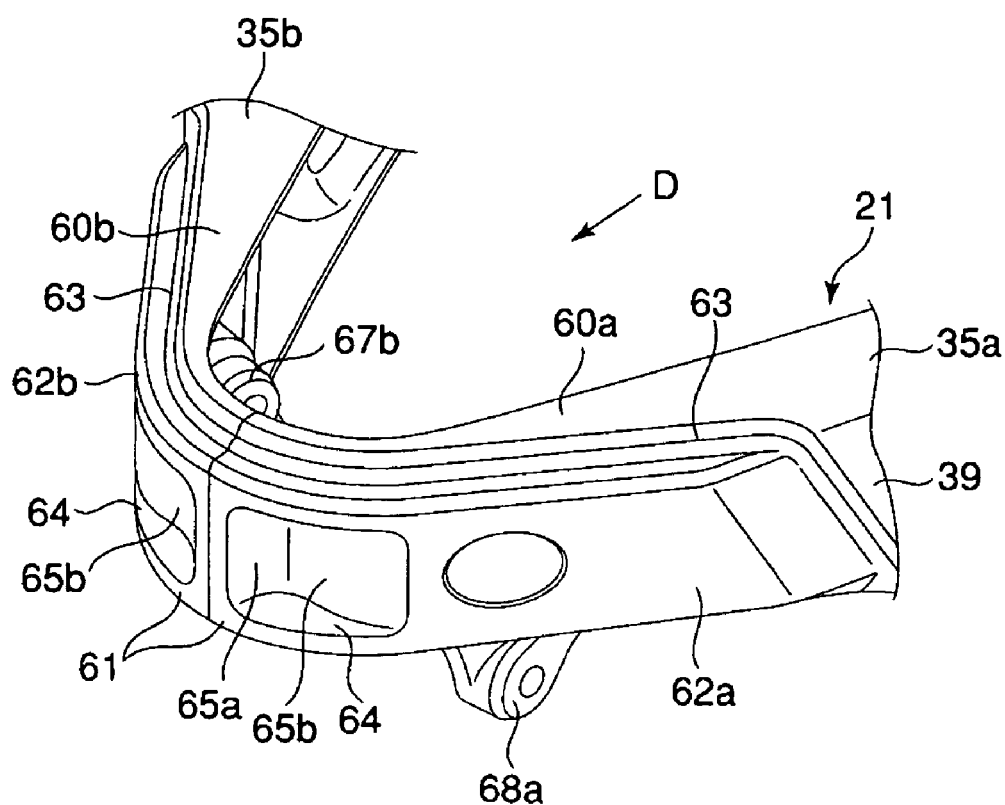

[Fig. 13]
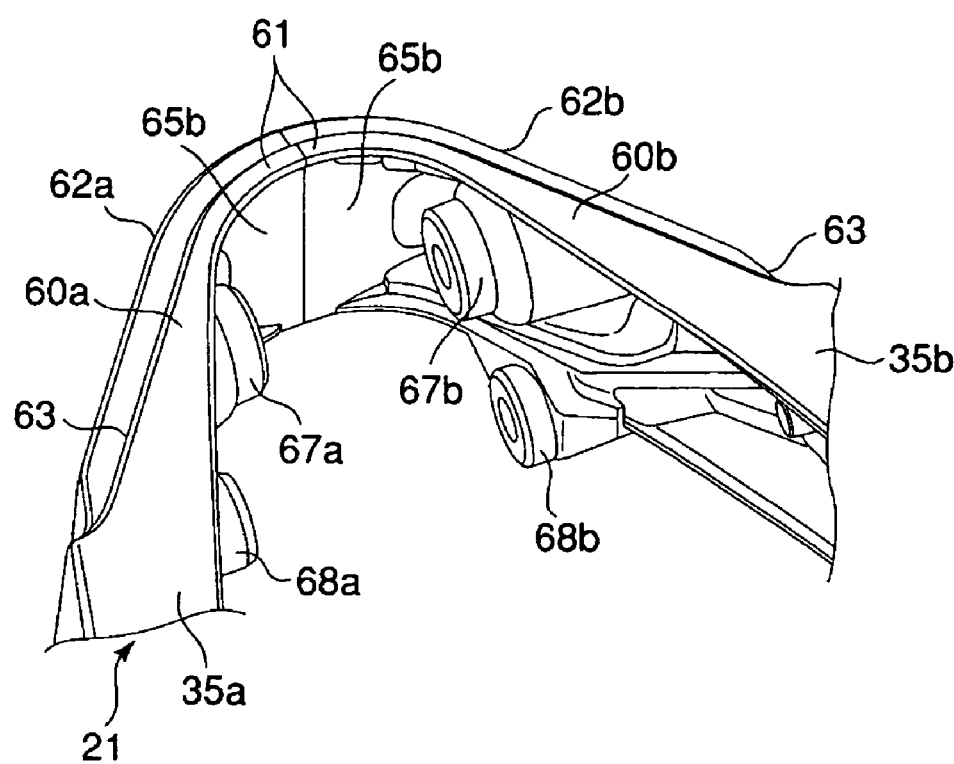

[Fig. 14]
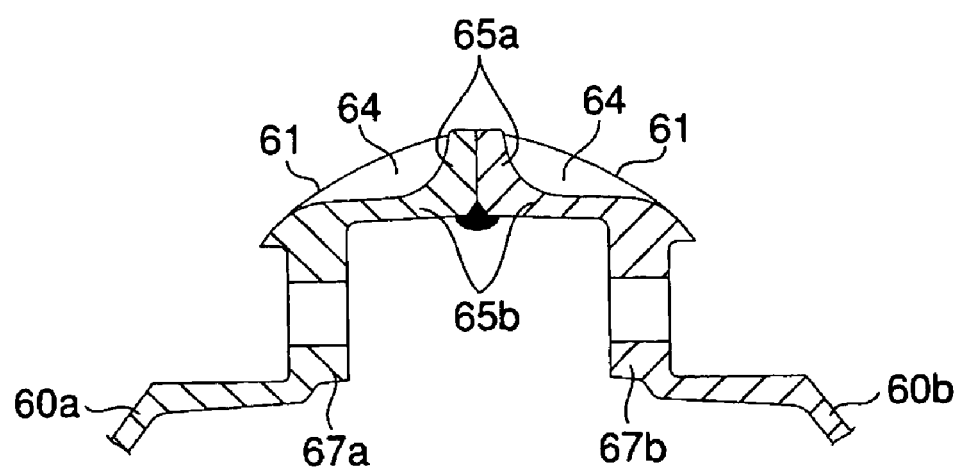

[Fig. 15]
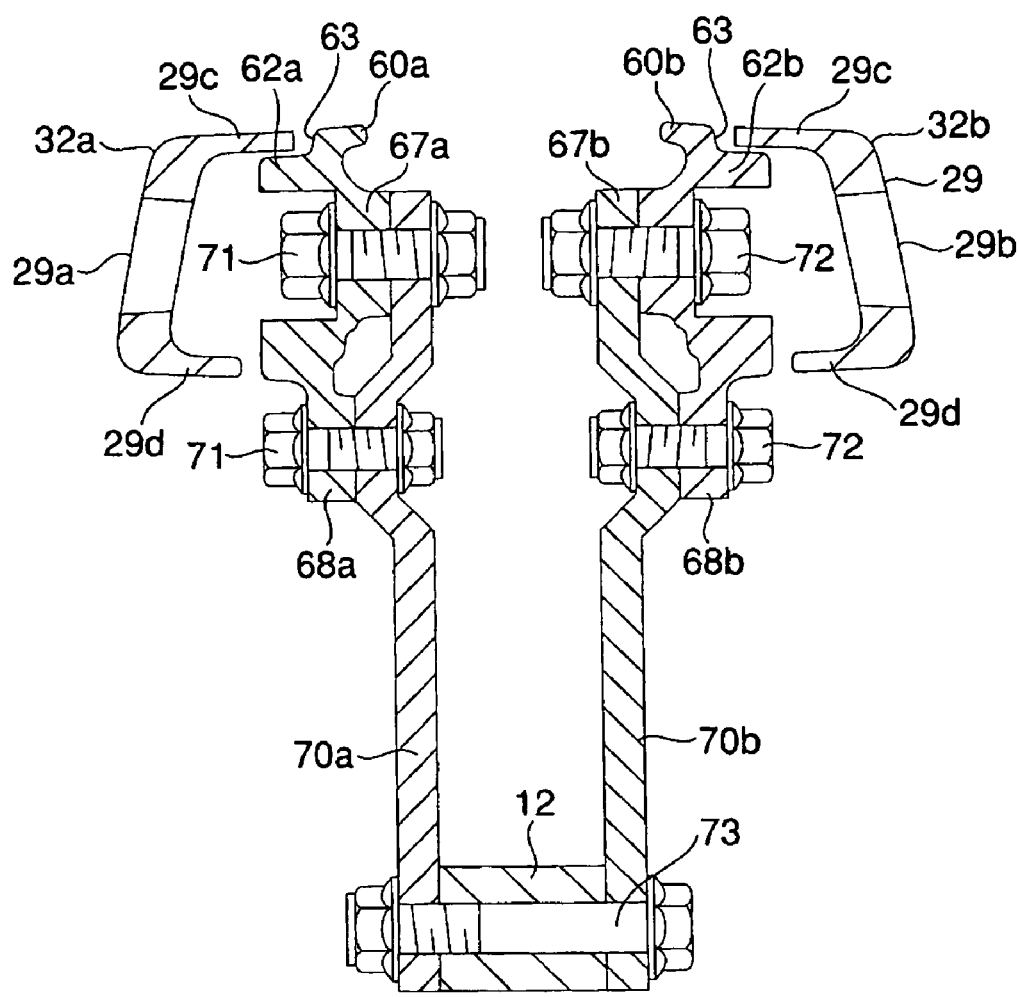

FRAME FOR MOTORCYCLES

BACKGROUND OF THE INVENTION

1. Field of the Invention

The present invention relates to a frame for motorcycles includes a first frame section to support a front fork, and a second frame section to support rear arms, and more particularly, to a construction, in which the first frame section and the second frame section are connected to each other.

2. Description of Related Art

Since a motorcycle for moto-cross races, for example, travels on rough terrain having extreme irregularities, a large impact load and a load of fatigue failure are applied on a frame through a front fork and rear arms. Therefore, in order to improve a motorcycle in kinematical performance, it is necessary to enhance the stiffness and strength of the frame while achieving lightening of the frame.

As for a frame which meets with such demands, there are conventionally known frames, in which a pivot frame to support the rear arms is constructed by a combination of casting and forging. Such pivot frame includes a pair of pivot plates to pivotally support the rear arms and an upper cross member connected to a main pipe. The pivot plates include a forging and have a cross sectional shape to be opened inward in a direction along a vehicle breadth. The upper cross member includes a casting and has a hollow closed, cross sectional shape.

The pivot plates are opposed to each other with the rear arms therebetween and include a fitted recess at an upper end thereof. The upper cross member is positioned between the upper ends of the pivot plates. The upper cross member has a pair of arms, which are bifurcated right and left to project, and fitting projections are formed at tip ends of the respective arms. The fitted recesses of the pivot plates are fitted laterally onto the fitting projections of the upper cross member. The upper end of the pivot frame is welded at an edge thereof to the arms of the upper cross member whereby the pivot frame and the upper cross member make a unitary structure.

The pivot frame is welded to the upper cross member in a state of covering the fitting projections of the upper cross member in a lateral direction. Therefore, the upper cross member is connected to the pivot frame while maintaining a hollow closed, cross sectional shape.

Since the pivot frame composed of a forging has a cross sectional shape to be opened inward in the direction along the vehicle breadth, however, it is not possible to avoid the situation, in which the frame is extremely varied in cross sectional shape at the connection of the upper cross member and the pivot frame. In other words, a cross sectional shape of the frame changes extremely from a closed cross section to an opened cross section at the connection of the upper cross member and the pivot frame, so that at the connection, the frame is greatly changed in strength and stiffness.

As a result, when a high load generated at the time of, for example, landing in jump acts on the frame, there occurs a phenomenon that the entire frame twists about the connection of the upper cross member and the pivot frame, thus causing a disadvantage having an adverse influence on the kinematical performance of the motorcycle.

The invention has been thought of based on the above situation, and has its advantage to provide a frame for motorcycles, capable of preventing an extreme change, in cross sectional shape, of a connection of a first frame section and a second frame section.

SUMMARY OF THE INVENTION

In order to attain the above advantage, a frame for motorcycles, according to an embodiment of the invention includes a first frame section having a head pipe portion that supports a front fork, and a second frame section having a pair of rear arm brackets that support a rear arm and are arranged away from each other in a direction along a vehicle breadth.

The first frame section includes a gusset portion having a hollow closed, cross sectional shape and formed with an opening, which is opened rearwardly of the head pipe portion. The rear arm brackets, respectively, include a connection end having a cross sectional shape to be opened inward in the direction along the vehicle breadth, and extending toward the gusset portion. The connection ends of the rear arm brackets are welded to an edge of the opening of the gusset portion.

According to an embodiment of the present invention, the gusset portion is not maintained in the closed cross sectional shape at a connection of the gusset portion and the rear arm brackets, and a cross sectional shape of the connection can be caused to smoothly change from a closed cross section to an opened cross section. Therefore, it is possible to prevent strength/stiffness of the frame from varying extremely at a connection of the gusset portion and the rear arm brackets, thus enhancing the motorcycle in kinematical performance.

BRIEF DESCRIPTION OF THE SEVERAL VIEWS OF THE DRAWINGS

FIG. 1 is a side view showing a motorcycle according to an embodiment of the present invention.

FIG. 2 is a side view showing a frame according to the embodiment of the present invention.

FIG. 3 is a perspective view showing the frame in a state, in which a first frame section and a second frame section are connected to each other, in the embodiment of the present invention.

FIG. 4 is a rear view showing the frame according to the embodiment of the present invention.

FIG. 5 is a plan view showing the frame as viewed in a direction indicated by a line A in FIG. 2.

FIG. 6 is a perspective view showing a shape of a connection of a gusset portion in the embodiment of the present invention.

FIG. 7 is a perspective view showing the second frame section according to the embodiment of the present invention.

FIG. 8 is a side view showing a rear arm bracket on the left, according to the embodiment of the present invention.

FIG. 9 is a rear view showing the rear arm bracket as viewed in a direction indicated by a line B in FIG. 8.

FIG. 10 is a side view showing a rear arm bracket on the right, according to the embodiment of the present invention.

FIG. 11 is a rear view showing the rear arm bracket as viewed in a direction indicated by a line C in FIG. 10.

FIG. 12 is a perspective view showing a shape of connection ends of the rear arm brackets in the embodiment of the present invention.

FIG. 13 is a perspective view as viewed in a direction indicated by a line D in FIG. 12.

FIG. 14 is a cross sectional view showing a state, in which the connection ends of the rear arm brackets are welded to each other in the embodiment of the present invention.

FIG. 15 is a cross sectional view taken along the line F15-F15 in FIG. 2.

DETAILED DESCRIPTION OF THE INVENTION

An embodiment of the invention will be described below with reference to the drawings.

FIG. 1 discloses a motorcycle 1 for moto-cross races for example. The motorcycle 1 includes a cradle-shaped frame 2. The frame 2 supports a front fork 3, rear arms 4, a water-cooled 4-cycle single cylinder engine 5, a fuel tank 6, and a seat 7.

The front fork 3 is steering-operated by a bar handle 8 and supports a front wheel 9. The rear arms 4 extend rearward from the frame 2 and support a rear wheel 10 at rear ends thereof. The engine 5 includes a crankcase 11 and a cylinder 12 rising from the crankcase 11. The engine 5 serves to drive the rear wheel 10 and includes a drive sprocket 13 at a rear end the crankcase 11. The length of a chain 15 is stretched between the drive sprocket 13 and a driven sprocket 14 of the rear wheel 10.

The fuel tank 6 is positioned just above the engine 5. The seat 7 extends substantially horizontally rearwardly of the fuel tank 6 from an upper surface of the fuel tank 6.

As shown in FIGS. 1 to 3, the frame 2 includes a first frame section 20, a second frame section 21, right and left seat rails 22, and right and left seat pillar tubes 23.

The first frame section 20 is formed from a casting of aluminum alloy and includes a head pipe portion 24 and a gusset portion 25. The head pipe portion 24 is positioned at a front end of the frame 2 to support the front fork 3.

The gusset portion 25 extends rearward and obliquely downward from the head pipe portion 24 and is in the form of a hollow box being longitudinal in a heightwise direction of the frame 2. More specifically, the gusset portion 25 includes right and left side walls 26a (only one of them being shown) and an upper wall 26b, the respective walls 26a, 26b being made integral with the head pipe portion 24. The side walls 26a are opposed to each other in a direction along the vehicle breadth, and a reinforcing member 27 is welded to be bridged between front edges of the side walls 26a. The reinforcing member 27 extends downward from a lower end of the head pipe portion 24. Therefore, the gusset portion 25 has a hollow closed, cross sectional shape, which is surrounded by the side walls 26a, the upper wall 26b, and the reinforcing member 27.

As shown in FIGS. 2 and 3, the gusset portion 25 includes a connection 29 projecting in a rearward manner and obliquely downward, and a downtube 30 projecting downward. The connection 29 is located just above the engine 5. The connection 29 includes right and left side walls 29a, 29b, an upper wall 29c, and a lower wall 29d. The side walls 29a, 29b of the connection 29 are contiguous to the side walls 26a of the gusset portion 25. The upper wall 29c of the connection 29 is bridged between upper edges of the side walls 29a, 29b and contiguous to the upper wall 26b of the gusset portion 25. The lower wall 29d of the connection 29 is bridged between lower edges of the side walls 29a, 29b. Further, the side walls 29a, 29b are inclined in directions away from each other as they go rearwardly of the gusset portion 25. Therefore, the connection 29 is in the form of a quadrangular box spreading in the direction along the vehicle breadth, and includes at a rear end thereof an opening 31 opened in a rearward manner.

As shown in FIGS. 3 and 6, the opening 31 is defined by rear edges of the side walls 29a, 29b, a rear edge of the upper wall 29c, and a rear edge of the lower wall 29d. The rear edge of the upper wall 29c and the rear edge of the lower wall 29d are cut off in a manner to be dented in a V-shape toward the head pipe portion 24. In other words, an opened end of the connection 29 includes a pair of bifurcated connection guides 32a, 32b. The connection guides 32a, 32b project rearwardly of the gusset portion 25 and are pointed in a tapered manner.

The downtube 30 of the gusset portion 25 projects downwardly of the head pipe portion 24 and are positioned forwardly of the engine 5. The downtube 30 is in the form of a rectangular cylinder and includes at a lower end thereof a pair of bifurcated connection arms 33a, 33b. The connection arms 33a, 33b are positioned just in front of the crankcase 11 of the engine 5. Engine brackets 34 are mounted to the respective connection arms 33a, 33b. The engine brackets 34 support a front end of the crankcase 11.

As shown in FIGS. 2 to 4, the second frame section 21 includes a pair of rear arm brackets 35a, 35b, a cross member 36, and a rear cushion bracket 37. The rear arm brackets 35a, 35b are composed of a forging made of aluminum alloy. The rear arm brackets 35a, 35b rise rearwardly of the engine 5 in the heightwise direction of the frame 2 and are arranged in parallel to and away from each other in the direction along the vehicle breadth.

As shown in FIGS. 7 to 11, the rear arm brackets 35a, 35b, respectively, include a side wall 39, a front wall 40, and a rear wall 41. The side wall 39 faces laterally of the frame 2 and extends in a substantially strap-like manner along the height of the frame 2. The front wall 40 projects inward from a front edge of the side wall 39 in the direction along the vehicle breadth. Likewise, the rear wall 41 projects inward from a rear edge of the side wall 39 in the direction along the vehicle breadth. Therefore, the rear arm brackets 35a, 35b have a C-shaped cross sectional shape to be opened inward in the direction along the vehicle breadth.

A plurality of reinforcing ribs 42 are formed integrally in a region surrounded by the side wall 39, the front wall 40, and the rear wall 41. The reinforcing ribs 42 reinforce the respective walls 39 to 41 from inside whereby stiffness is sufficiently ensured for the rear arm brackets 35a, 35b.

The rear arm brackets 35a, 35b, respectively, include a cylindrical-shaped boss portion 43 and a fitting recess 44. The boss portion 43 is positioned rearwardly of the crankcase 11. A rear end of the crankcase 11 and front ends of the rear arms 4 are interposed between the boss portion 43 of the rear arm bracket 35a and the boss portion 43 of the rear arm bracket 35b and supported by the boss portions 43 through pivots 45. The fitting recesses 44 are positioned at lower ends of the rear arm brackets 35a, 35b to be opened inward in the direction along the vehicle breadth.

The cross member 36 is composed of an extruded bar made of aluminum alloy to be in the form of a rectangular cylinder. One end of the cross member 36 is fitted into the fitting recess 44 of one of the rear arm brackets 35a to be welded thereto. The other end of the cross member 36 is fitted into the fitting recess 44 of the other of the rear arm brackets 35b to be welded thereto. Accordingly, the cross member 36 connects between the lower ends of the rear arm brackets 35a, 35b.

The cross member 36 includes a pair of supports 47a, 47b protruding in a rearward manner. The supports 47a, 47b are integrally scraped from the cross member 36 and arranged in parallel to and away from each other in the direction along the vehicle breadth. A linkage 48 is bridged between the supports 47a, 47b and the rear arms 4.

As shown in FIGS. 2 and 3, the lower ends of the rear arm brackets 35a, 35b are connected to the connection arms 33a, 33b of the downtube 30 through a pair of lower tubes 49a, 49b. The lower tubes 49a, 49b extend below the crankcase 11 of the engine 5 in a longitudinal direction of the frame 2 and separate from each other in the direction along the vehicle breadth. Front ends of the lower tubes 49a, 49b are welded to the connection arms 33a, 33b of the downtube 30. Rear ends of the lower tubes 49a, 49b are welded to the lower ends of the rear arm brackets 35a, 35b.

Upwardly projecting engine brackets 50, respectively, are welded to intermediate portions of the lower tubes 49a, 49b. The engine brackets 50 support a lower end of the crankcase 11. Thus, the downtube 30 and the lower tubes 49a, 49b hold the crankcase 11 of the engine 5.

As shown in FIGS. 2 and 3, the rear arm brackets 35a, 35b include extensions 52a, 52b extending from upper ends thereof upwardly of the engine 5. Receivers 53a, 53b are formed on upper surfaces of the extensions 52a, 52b to project upward. The receivers 53a, 53b are opposed to each other in the direction along the vehicle breadth and include fitted portions 54 as shown in FIGS. 8 and 10. The fitted portions 54 are opened inward in the direction along the vehicle breadth.

The rear cushion bracket 37 is composed of a casting made of aluminum alloy to be in the form of a rectangular cylinder. One end of the rear cushion bracket 37 is fitted into and welded to the fitted portion 54 of one of the receivers 53a. The other end of the rear cushion bracket 37 is fitted into and welded to the fitted portion 54 of one of the receivers 53b. Accordingly, the rear cushion bracket 37 connects between the extensions 52a, 52b of the rear arm brackets 35a, 35b.

The rear cushion bracket 37 includes at an intermediate portion thereof a support 55 projecting rearward. The support 55 is positioned above the front ends of the rear arms 4. A single hydraulic damper 56 is bridged between the support 55 and the linkage 48 connected to the rear arms 4.

As shown in FIG. 1, the support 55 of the rear cushion bracket 37 supports front ends of the seat rails 22. The seat rails 22 extend in a rearward manner from the support 55 to support a rear half of seat 7. The seat pillar tubes 23 are bridged between rear ends of the seat rails 22 and lower portions of the rear arm brackets 35a, 35b to support the rear ends of the seat rails 22.

As shown in FIGS. 7, 12, and 13, the rear arm brackets 35a, 35b include connection ends 60a, 60b at tip ends of the extensions 52a, 52b thereof. The connection ends 60a, 60b and the extensions 52a, 52b are formed by extending the side walls 39, the front walls 40, and the rear walls 41 of the rear arm brackets 35a, 35b. Therefore, the extensions 52a, 52b and the connection ends 60a, 60b, respectively, have a C-shaped cross sectional shape to be opened inward in the direction along the vehicle breadth, and are reinforced from inside by the reinforcing ribs 42.

The connection ends 60a, 60b extend toward the connection 29 of the gusset portion 25 from tip ends of the extensions 52a, 52b. In the embodiment, the connection ends 60a, 60b are inclined in directions approaching each other as they go toward the connection 29, and include a wall 61 projecting inward in the direction along the vehicle breadth. The walls 61 of the connection ends 60a, 60b abut against each other on a center line of the frame 2.

Thus the connection ends 60a, 60b are formed to be tapered toward the connection 29 and have an external shape to follow the edge of the upper wall 29c and the edge of the lower wall 29d, which are cut off in a V-shaped manner.

As shown in FIGS. 12 and 13, the connection ends 60a, 60b include fitting projections 62a, 62b projecting from outer surfaces thereof. The fitting projections 62a, 62b are contiguous to the walls 61 and adapted to be fitted inside the opening 31 of the connection 29. Steps 63 are formed at boundaries of outer peripheries of the fitting projections 62a, 62b and the connection ends 60a, 60b. The steps 63 are opposed to the edges of the side walls 29a, 29b, the edge of the upper wall 29c, and the edge of the lower wall 29d, which face the opening 63.

Further, the walls 61 at tip ends of the connection ends 60a, 60b, respectively, include a recess 64. As shown in FIG. 14, the recess 64 is defined by a first wall 65a, which extends in the longitudinal direction of the frame 2, and a second wall 65b, which extends in the direction along the vehicle breadth. The first wall 65a defines a butt portion of the wall 61. Therefore, the provision of the recesses 64 makes it possible to sufficiently ensure a contact area at the walls 61 of the connection ends 60a, 60b.

The second walls 65b of the walls 61 are aligned on a straight line in a widthwise direction of the frame 2. The walls 61 of the connection ends 60a, 60b are joined integrally by welding corner portions defined by the first wall 65a and the second walls 65b. Therefore, the pair of rear arm brackets 35a, 35b are connected at front ends thereof to each other.

The rear arm brackets 35a, 35b are fixed to the connection 29 of the gusset portion 25 by fitting the fitting projections 62a, 62b of the connection ends 60a, 60b into the opening 31 of the connection 29 and welding all around between the steps 63 and the edges of the side walls 29a, 29b, the edge of the upper wall 29c, and the edge of the lower wall 29d.

In other words, the connection ends 60a, 60b are welded to an edge of the opening 29. As shown in FIG. 3, in a state, in which the rear arm brackets 35a, 35b are welded to the gusset portion 25, the side walls 39, the front walls 40, and the rear walls 41 of the rear arm brackets 35a, 35b are contiguous to the side walls 29a, 29b, the lower walls 29d and the upper walls 29c of the connection 29.

As shown in FIGS. 13 and 15, the rear arm brackets 35a, 35b include cylindrical-shaped bosses 67a, 67b projecting inward from inner surfaces of the connection ends 60a, 60b, and brackets 68a, 68b projecting downward from lower surfaces of the connection ends 60a, 60b. The bosses 67a, 57b are positioned rearwardly of the walls 61. The brackets 68a, 68b are positioned downwardly of the bosses 67a, 67b.

The boss 67a and the bracket 68a of one of the connection ends 60a support an engine bracket 70a through a bolt 71. Likewise, the boss 67b and the bracket 68b of the other of the connection ends 60b support a further engine bracket 70b through a bolt 72.

The engine brackets 70a, 70b project downward from the connection ends 60a, 60b, and are arranged in parallel to each other with a spacing therebetween. Lower ends of the engine brackets 70a, 70b are fixed to an upper end of the cylinder 12 of the engine 5 through bolts 73. Therefore, the cylinder 12 of the engine 5 is suspended from the connection ends 60a, 60b of the rear arm brackets 35a, 35b.

With such construction, the gusset portion 25 of the first frame section 20 includes the connection 29 formed with the opening 31 opened rearwardly. The rear arm brackets 35a, 35b of the second frame section 21 include the connection ends 60a, 60b fitted into the opening 31 of the connection 29 and welded to each other. The connection ends 60a, 60b are welded to an edge of the opening 31 whereby the gusset portion 25 of the first frame section 20 and the rear arm brackets 35a, 35b of the second frame section 21 join together.

Therefore, the gusset portion 25 is not maintained in the hollow closed, cross sectional shape at a connection of the gusset portion 25 and the connection ends 60a, 60b, and a cross sectional shape of the connection smoothly changes from the closed cross section of the gusset portion 25 to an opened cross section of the rear arm brackets 35a, 35b.

Accordingly, although the construction connects a casting having the hollow closed, cross sectional shape and a forging having the C-shaped cross sectional shape to each other, it is possible to prevent strength/stiffness of the frame 2 from varying extremely at a connection of the gusset portion 25 and the rear arm brackets 35a, 35b. As a result, even in the case where a large load acts on the frame 2 through the front fork 3 and the rear arms 4 when the motorcycle 1 is traveling, it is possible to prevent the frame 2 from twisting and flexing about the connection, thus improving the motorcycle 1 in kinematical performance.

Besides, edges of the upper walls 29c and edges of the lower walls 29d to define the edge of the opening 31 are cut off to be made V-shaped toward the head pipe portion 24, and the connection ends 60a, 60b of the rear arm brackets 35a, 35b are tapered in shape to follow the edge of the upper wall 29c and the edge of the lower wall 29d.

Therefore, in welding the connection ends 60a, 60b of the rear arm brackets 35a, 35b to the edge of the opening 31, it is possible to ensure a sufficient weld length. Accordingly, the connection of the gusset portion 25 and the rear arm brackets 35a, 35b is enhanced in strength.

Further, with the construction, the rear arm brackets 35a, 35b are welded together at the connection ends 60a, 60b disposed at front ends thereof, and connected together at the lower ends thereof through the cross member 36.

Based on the above, the second frame section 21 can be beforehand assembled as a sub-assembly. Accordingly, it is possible to reduce the number of parts and locations of welding when the frame 2 is assembled, thus enabling shortening of work hours when the frame 2 is assembled.

Besides, since the connection ends 60a, 60b of the rear arm brackets 35a, 35b and the walls 61, respectively, are only inclined inward in the direction along the vehicle breadth, the rear arm brackets 35a, 35b are not made complicate in shape. As a result, complication in mold structure for forging is avoided and the rear arm brackets 35a, 35b do not become worse in forging quality.

The invention is not limited to the above embodiment but can be embodied in various changes within a range not departing from the gist of the invention.

For example, according to the embodiment, the connection ends of the rear arm brackets are caused to abut against each other to be subjected to butt welding. However, the invention is not limited thereto but the connection ends may be separated from each other within an opened range of the opening.

Also, according to the embodiment, the fitting projections fitted inside the opening are formed on the connection ends of the rear arm brackets but the invention is not limited thereto. For example, a further low step may be formed at the opened edge of the opening, and flanges covering the step may be formed on the connection ends and may be welded to the opened edge of the opening.

Further, the frame in the invention is not limited to cradle-shaped one. For example, a diamond-shaped frame, in which the lower tube is omitted and which makes use of a crankcase of an engine as a strength member, is likewise workable.

The invention claimed is:

1. A frame for motorcycles, comprising:
   a first frame section having a head pipe portion that supports a front fork; and
   a second frame section having a pair of rear arm brackets that support a rear arm and are arranged away from each other in a direction along a vehicle breadth,
   wherein the first frame section comprises a gusset portion formed as a rectangular box having a hollow closed, cross sectional shape and formed with an opening, which is opened rearwardly of the head pipe portion, and the rear arm brackets, respectively, comprise a connection end having a cross sectional shape to be opened inward in the direction along the vehicle breadth, and extending toward the gusset portion, and wherein the connection ends of the rear arm brackets are welded to an edge of the opening of the gusset portion.

2. The frame for motorcycles, according to claim 1, wherein the connection ends of the rear arm brackets project in directions approaching each other as they go toward the gusset portion.

3. The frame for motorcycles, according to claim 1, wherein the connection ends of the rear arm brackets are caused to abut against each other and are welded together.

4. The frame for motorcycles, according to claim 3, wherein the rear arm brackets are connected to each other at ends thereof opposed to the connection ends through a cross member.

5. The frame for motorcycles, according to claim 1, wherein the gusset portion comprises an upper wall, a lower wall, and right and left side walls, and enlarges in the direction along the vehicle breadth as it goes rearwardly of the head pipe portion.

6. The frame for motorcycles, according to claim 5, wherein the upper wall, the lower wall, and the side walls, respectively, have an edge that forms the opening, the edge of the upper wall and the edge of the lower wall are cut off to be dented toward the head pipe portion, and the connection ends of the rear arm brackets are shaped to follow the edge of the upper wall and the edge of the lower wall.

7. The frame for motorcycles, according to claim 1, wherein the connection ends of the rear arm brackets comprise fitting projections adapted to be fitted inside the opening.

8. A frame for motorcycles, comprising:
   a first frame section having a head pipe portion that supports a front fork, and a gusset portion extending rearwardly of the head pipe portion; and
   a second frame section having a pair of rear arm brackets that support a rear arm and are arranged away from each other in a direction along a vehicle breadth,
   wherein the gusset portion of the first frame section is formed as a rectangular box and has a hollow closed, cross sectional shape and comprises an opened end, which is bifurcated to project toward the second frame section, at an opposite end thereof to the head pipe portion, and
   wherein the rear arm brackets, respectively, comprise a connection end having a cross sectional shape to be opened inward in the direction along the vehicle breadth, and extending toward the opened end of the gusset portion, and the connection ends of the rear arm brackets project in directions approaching each other as they go toward the gusset portion and are fitted into the opened end of the gusset portion to be welded thereto.

9. The frame for motorcycles, according to claim 1, wherein the first frame section comprises a casting and the rear arm brackets of the second frame section comprise a forging.

10. The frame for motorcycles, according to claim 8, wherein the connection ends of the rear arm brackets are caused to abut against each other and are welded together.

11. A frame for motorcycles, comprising:
- a casting formed as a rectangular box having a hollow closed, cross sectional shape and formed with an opening; and
- a pair of forgings opposed to each other and having an opened, cross sectional shape,
- wherein the forgings, respectively, comprise a connection end extending toward the opening of the casting, and the connection ends of the forgings are welded to an edge of the opening, and
- wherein the connection end of each forging includes a wall projecting inward in a frame breadth direction, and wherein the walls abut against the casting and against each other on a center line of the frame.

12. The frame for motorcycles, according to claim 11, wherein the casting is shaped to enlarge as it goes toward the opening, and the connection ends of the forgings project in directions approaching each other as they go toward the casting and are welded at tip ends thereof.

13. The frame for motorcycles, according to claim 2, wherein the connection ends of the rear arm brackets are caused to abut against each other and are welded together.

14. The frame for motorcycles, according to claim 2, wherein the gusset portion comprises an upper wall, a lower wall, and right and left side walls, and enlarges in the direction along the vehicle breadth as it goes rearwardly of the head pipe portion.

15. The frame for motorcycles, according to claim 3, wherein the gusset portion comprises an upper wall, a lower wall, and right and left side walls, and enlarges in the direction along the vehicle breadth as it goes rearwardly of the head pipe portion.

16. The frame for motorcycles, according to claim 2, wherein the connection ends of the rear arm brackets comprise fitting projections adapted to be fitted inside the opening.

17. The frame for motorcycles, according to claim 3, wherein the connection ends of the rear arm brackets comprise fitting projections adapted to be fitted inside the opening.

18. The frame for motorcycles, according to claim 8, wherein the first frame section comprises a casting and the rear arm brackets of the second frame section comprise a forging.

19. The frame for motorcycles, according to claim 9, wherein the connection ends of the rear arm brackets are caused to abut against each other and are welded together.

20. The frame for motorcycles, according to claim 11, further comprising a gusset portion.

* * * * *

UNITED STATES PATENT AND TRADEMARK OFFICE
CERTIFICATE OF CORRECTION

PATENT NO. : 7,296,814 B2
APPLICATION NO. : 11/088260
DATED : November 20, 2007
INVENTOR(S) : Masatoshi Miyamoto It is certified that error appears in the above-identified patent and that said Letters Patent is hereby corrected as shown below:

Title Page;
Col. 1, Item (73) change "Yamah Hatsudoki Kabushiki Kaisha" to
--Yamaha Hatsudoki Kabushiki Kaisha--.

Signed and Sealed this

Eighth Day of April, 2008

JON W. DUDAS
*Director of the United States Patent and Trademark Office*